United States Patent [19]

Willert et al.

[11] 3,824,875

[45] July 23, 1974

[54] DRIVE FOR TWIN SCREW EXTRUDER

[75] Inventors: William H. Willert, North Plainfield; Jai G. Ro, Flemington, both of N.J.

[73] Assignee: Egan Machinery Company, Somerville, N.J.

[22] Filed: May 21, 1973

[21] Appl. No.: 362,178

[52] U.S. Cl............. 74/665 GA, 74/410, 74/665 N
[51] Int. Cl............................................. F16k 37/06
[58] Field of Search ....... 74/665 F, 665 G, 665 GA, 74/665 GB, 665 GC, 665 GD, 665 S, 665 L, 665 M, 665 N; 74/410

[56] References Cited
UNITED STATES PATENTS

| | | | |
|---|---|---|---|
| 2,892,362 | 6/1959 | Nicholas | 74/665 GA |
| 3,592,078 | 7/1971 | Stark | 74/665 |

*Primary Examiner*—Samuel Scott
*Assistant Examiner*—J. Reep

[57] ABSTRACT

Drive apparatus for imparting rotation in opposite directions to a pair of output shafts which are rotatable about longitudinal axes that are parallel and in close proximity to each other. The drive apparatus is comprised of a first train of pinions and gears, including an input pinion rotatable with an input shaft, a first intermediate gear that meshes with the input pinion and is mounted on a shaft which is provided with a drive pinion that meshes with a planetary ring gear and with a sun gear within the confines of the ring gear, and an output pinion that meshes with the sun gear and with the ring gear and is rotatable with one of the output shafts. The drive apparatus is also comprised of a second train of pinions and gears which is similar to the first train and includes a second intermediate gear that meshes with the first intermediate gear and an output pinion that is rotatable with the other output shaft. The pinion and gear trains are actuated simultaneously and in unison by a single prime mover connected to the input shaft of one of the trains or by a pair of prime movers, each of which is connected to the input shaft of a corresponding train.

12 Claims, 5 Drawing Figures

3,824,875

DRIVE FOR TWIN SCREW EXTRUDER

BACKGROUND OF THE INVENTION

This invention relates to the art of drive apparatus and, more particularly, to such apparatus for imparting rotation in opposite directions to each of a pair of shafts which are rotatable about corresponding longitudinal axes that are parallel and in close proximity to each other. The invention pertains, more specifically, to drive apparatus incorporating a novel gear transmission which is interposed between and coupled to at least one prime mover and indicated pair of shafts.

The drive apparatus of this invention is especially useful for driving the screws of a twin screw plastics extruder. For this reason, the accompanying drawings and the detailed description further along herein illustrate and describe a preferred form of the invention in association with the screws of such an extruder. It should be borne in mind, however, that this is without limiation since the invention has other applications.

There are two basic types of twin screw extruders, namely those in which the screws rotate in the same direction and are known as co-rotating screws, and those in which the screws rotate in opposite directions and are known as counterrotating screws. The present invention is concerned with the counter-rotating screw type extruder.

Known twin screw extruders employing counter-rotating screws include those disclosed in U.S. Pat. No. 2,987,774 and 3,501,807, wherein the screws are of the intersecting type in that the center distance between the screws is less than the diameter of the screws, and in U.S. Pat. No. 3,078,511 wherein the screws are non-intersecting and the center distance between the screws is substantially equal to the diameter of the screws.

One of the problems associated with a twin screw extruder is that of designing and furnishing to its screws a suitable drive apparatus which is capable of transmitting high torque to the screws with a high degree of reliability and long life. Since the center distance between the screws is equal or substantially equal to the diameter of the screws, in the case of an extruder of the non-intersecting screw type, or less than the diameter of the screws, in the case of the intersecting screw type, it is evident, where gears are provided on the screws or on the output shafts of drive means and arranged side-by-side, that the gears must be smaller in diameter than the screws; while, in the case of gears which are axially offset from each other, at least one of the gears can be only slightly larger than the diameter of the screws because, otherwise, there will be interference between the gears and the screw shanks or output shafts which must be as large as possible in diameter in order to transmit the required torque to the screws.

Typical of prior art twin screw extruder drives is that disclosed in U.S. Pat. No. 3,359,826 wherein a first output shaft (13) is driven by an output gear (12) in mesh with an input pinion (6), while a second output shaft (unnumbered) is driven by an output gear (17) in mesh with a pinion (16) on shaft (15). Shaft (15) is driven through a gear (11) and input pinion (6). It is noted that, while the drive to output shaft (13) is through a large diameter output gear (12), the second output shaft is driven through a small diameter output gear (17). The small diameter of the output or driven gear limits the amount of power that can be transmitted to this gear by the driving gear and, in many cases, the maximum power is below that desired to be transmitted to the screw, even after selection of the optimum factors of gear tooth form, gear material, hardening procedures, and the like. Increasing the face width of the gear is effective only up to a certain degree since, as is well known in the art, face widths over the optimum result in non-uniformity of tooth contact and, therefore, little or no increase in load capacity. This is especially true where one or both gears are of small diameter and, therefore, subject to excessive deflections under load. The tooth loads on the output gears of a twin screw extruder are extremely high and the limited number of teeth allowable on one or more of these gears results in rapid wearing of the gears.

As will be recognized by persons trained in the art from the ensuing detailed description and the accompanying drawings, the drive apparatus of this invention constitutes a worthwile improvement over known drives for imparting rotation in opposite directions to a pair of shafts which are rotatable about corresponding longitudinal axes that are parallel and in close proximity to each other. In this connection, the present drive apparatus utilizes a gear system having its parts so constructed and arranged that the tooth loads on the gears during active service are approximately halved as compared with prior art drives, thereby resulting in considerably longer gear life and/or greater power-transmitting capability for the drive.

SUMMARY OF THE INVENTION

As was stated earlier herein, this invention pertains to an improved drive apparatus for imparting rotation in opposite directions to first and second output shafts which are rotatable about corresponding longitudinal axes that are parallel and in close proximity to each other. The drive apparatus is comprised of a first train of pinions and gears, including an input pinion rotatable with an input shaft, a first intermediate gear that meshes with the input pinion and that is mounted on a shaft which is provided with a drive pinion that meshes with a planetary ring gear and with a sung gear within the confines of the ring gear, and an output pinion that meshes with the sun gear and with the ring gear and is rotatable with one of the output shafts. The drive apparatus is also comprised of a second train of pinions and gears which is similar to the first train and includes a second intermediate gear that meshes with the first intermediate gear and an output pinion that is rotatable with the other output shaft.

The pinion and gear trains are actuated simultaneously and in unison by a single prime mover connected to the input shaft of one of the trains or by a pair of primt movers, each of which is connected to the input shaft of a corresponding train.

The support means preferably comprises a housing including a horizontally disposed body having an opening extending through and between its front and rear ends, front cover means secured to the front end of the body and rear cover means secured to the rear end of the body. The several pinions and gears ae positioned within the housing. Both output shafts extend through and beyond the rear cover means.

The primary object of this invention is to provide novel and improved drive apparatus for imparting rotation in opposite directions to a pair of shafts which are rotatable about longitudinal axes that are parallel and in close proximity to each other.

Another object of this invention is to provide drive apparatus of the type stated in which the tooth load on its output gears is substantially one half that of comparable prior art drives.

Another object of this invention is to provide drive apparatus of the type stated in which a plurality of pinions and gears is so constructed and arranged that the gear life is considerably longer and/or the power-transmitting capability is substantially greater than in the case of known drives.

Another object of this invention is to provide drive apparatus of the type stated wherein the bearing loads on its output shafts are substantially less than those of prior art drives.

A further object of this invention is to provide drive apparatus of the type stated which is adapted to be actuated by a single prime mover or a pair of prime movers operating independently.

A still further object of this invention is the provision of drive apparatus of the type stated that is compact in design; that is reasonable in manufacturing, installation and maintenance costs; and that affords economical, efficient, long-term and reliable service in use.

The enumerated objects and additional objects, as well as the advantages of the invention, will be manifest to persons trained in the art from the following detailed description and the annexed drawings which describe and illustrate a preferred embodiment of the invention.

BRIEF DESCRIPTION OF THE DRAWINGS

In the drawings, wherein like reference numerals identify corresponding parts in the several views.

DESCRIPTION OF THE PREFERRED EMBODIMENT

Figure 1:
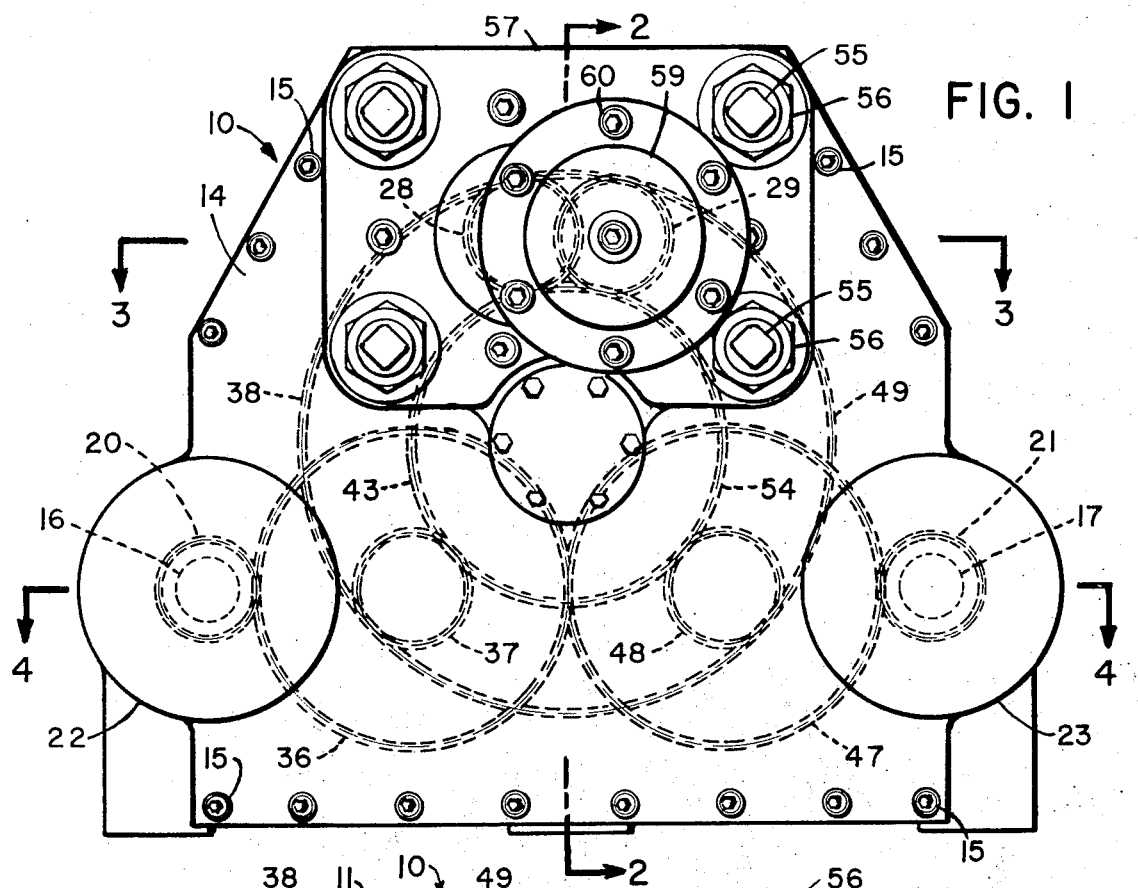
FIG. 1 is a rear elevation view of drive apparatus constructed in accordance with this invention.
Figure 2:
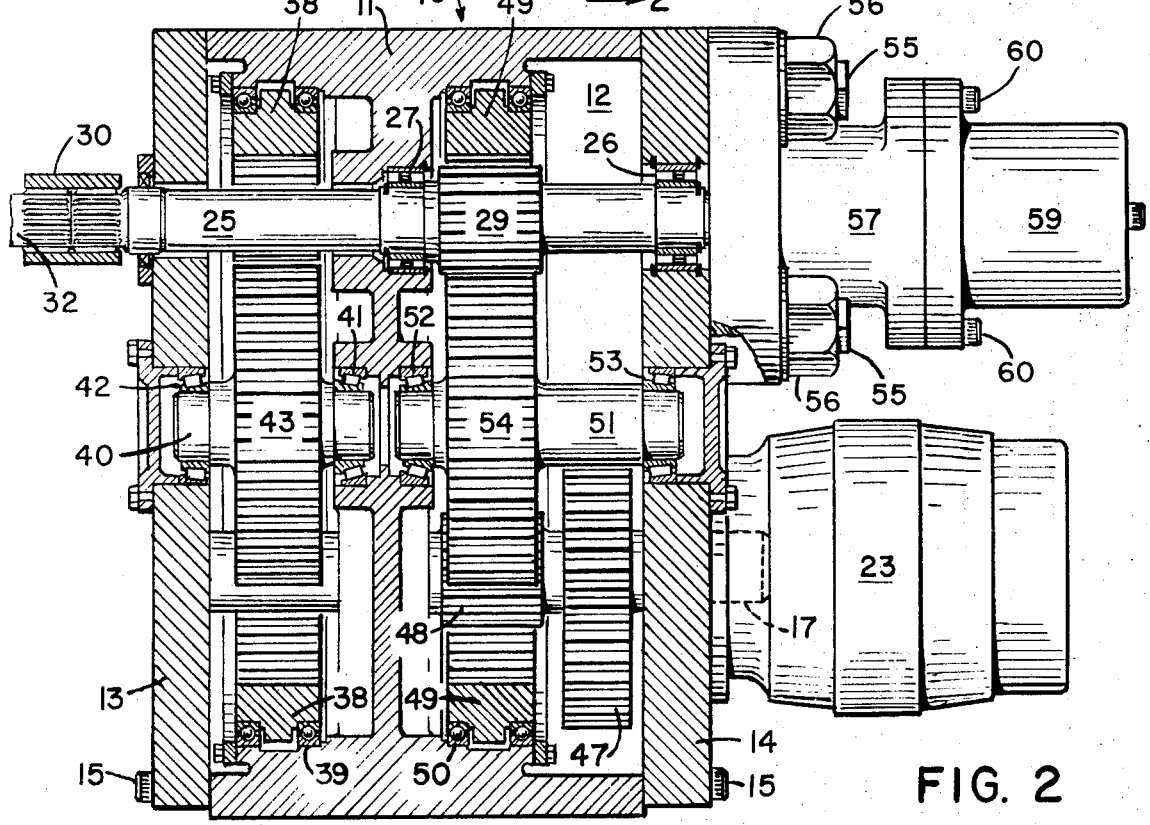
FIG. 2 is a view in vertical cross-section taken along line 2—2 of FIG. 1 and shows the drive apparatus operatively connected to one of the screws of a twin screw extruder.

Reference is first had to FIGS. 1 and 2 which illustrate a housing 10 that serves as support means for parts to be described and that comprises a horizontally disposed body 11, having an opening 12 extending through and between its front and rear ends, a front cover plate 13 across the front end of the body and a rear cover plate 14 across the rear end of the body. The cover plates are removably secured to the indicated ends of the body by screws 15.

The drive apparatus includes a pair of spaced, parallel, input shafts, namely a first input shaft 16 and a second input shaft 17. These shafts are mounted for rotation in corresponding roller bearings 18 and 19, (FIG. 4), carried by the housing, and project through and beyond rear cover plate 14. A first input pinion 20 is secured to and rotatable with first input shaft 16, while a like second input pinion 21 is secured and rotatable with second input shaft 17.

Figure 4:
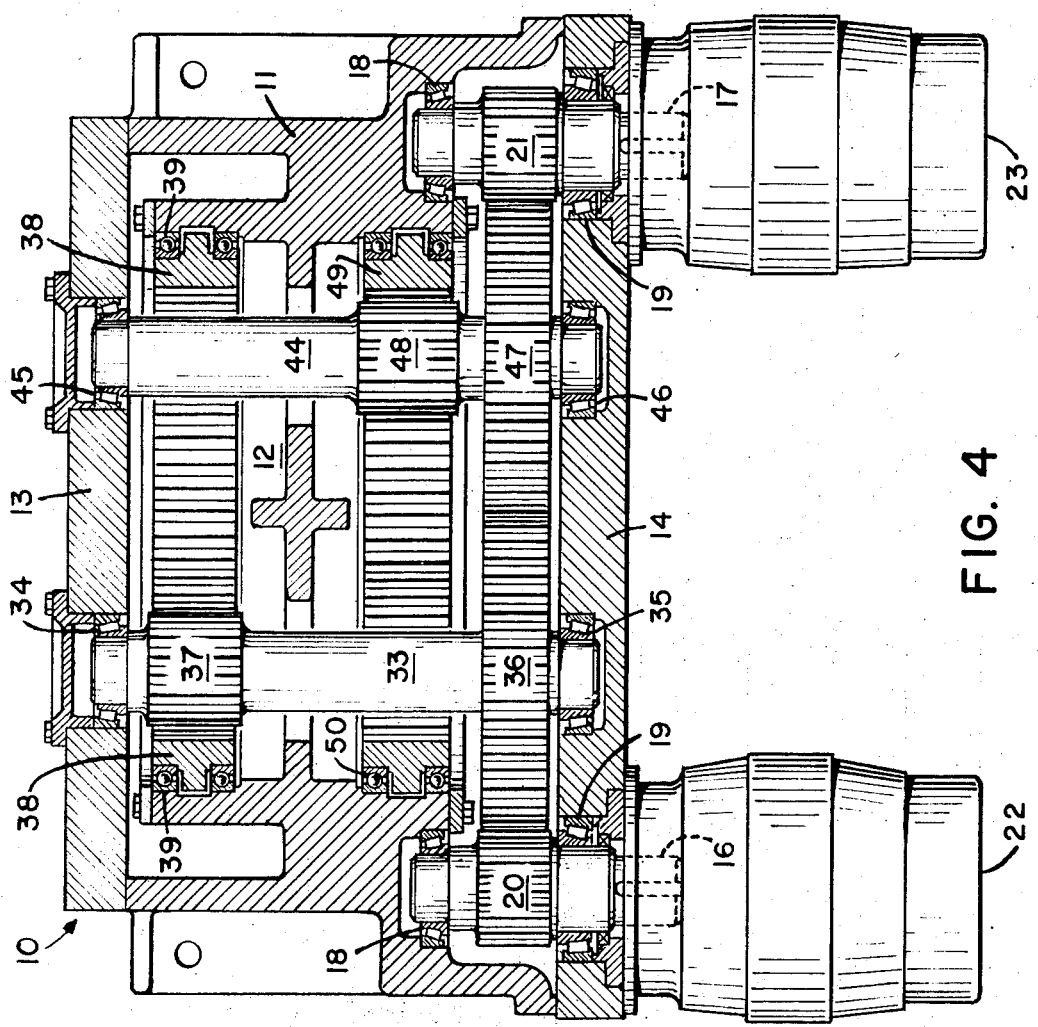
FIG. 4 is another view in horizontal cross-section taken along line 4—4 of FIG. 1.

Driving rotation is imparted to first input shaft 16 by a first prime mover 22 and to a second input shaft 17 by a second prime mover 23 (FIG. 4). The prime movers are preferably electric motors and are adapted to rotate the input shafts in opposite directions, as indicated by the arrows in FIG. 5.

Figure 3:
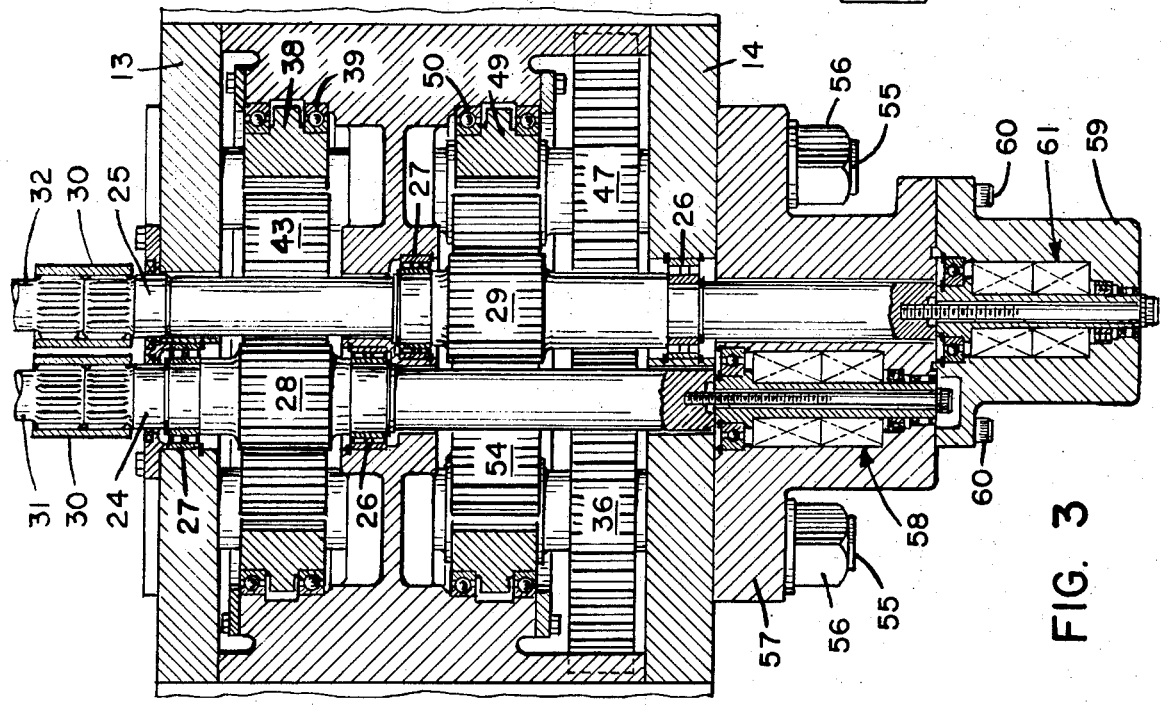
FIG. 3 is a view in horizontal cross-section taken along line 3—3 of FIG. 1 and shows the drive apparatus operatively connected to both screws of the twin screw extruder.

The drive apparatus also includes a pair of parallel, closely adjacent, output shafts, namely a first output shaft 24 and a second output shaft 25. These shafts are mounted for rotation in corresponding roller bearings 26 and 27, carried by the housing (FIG. 2), and project through and beyond front cover plate 13 (FIG. 3). A first output pinion 28 is secured to and rotatable with first output shaft 24, while a like second output pinion 29, is secured to and rotatable with a second output shaft 25. Output shafts 24 and 25 are coupled by corresponding spline sleeve 30 to respective screws 31 and 32 of a twin screw plastics extruder of the counter-rotating type referred to earlier herein.

A first intermediate shaft 33 extends through the opening defined by housing body 11 and is mounted for rotation in a roller bearing 34 carried by front cover plate 13 and a roller bearing 35 carried by rear cover plate 14 (FIG. 4). A first intermediate gear 36 is secured to and rotatable with shaft 33 and meshes with first input pinion 20. Also secured to and rotatable with shaft 33 is a first drive pinion 37 which meshes with a first planetary ring gear 38 (FIGS. 4 and 5) that is rotatably mounted in a ball bearing 39 within the housing FIG. 4) and meshes with first output pinion 28.

As is best shown in FIG. 2, a first sun or idler gear shaft 40 is supported for rotation in rolle bearings 41 and 42 and is provided with a first sun or idler gear 43 which is positioned within the confines of first planetary ring gear 38 and meshes with first drive pinion 37 and with first output pinion 28.

Figure 5:
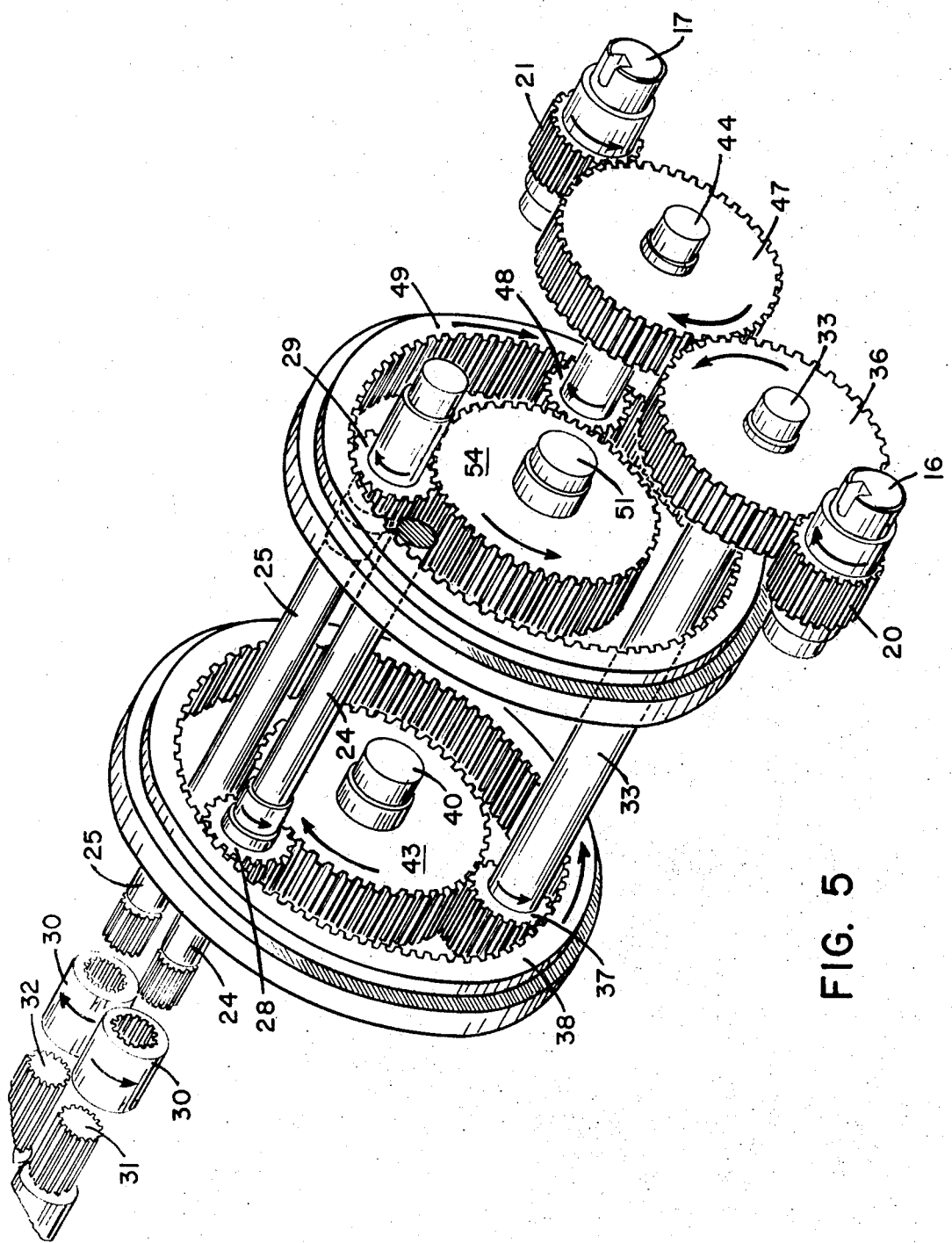
FIG. 5 is an exploded isometric view of the drive apparatus gearing and associated devices shown in other views.

It will be observed from an examination of FIG. 5 that clockwise rotation of first input shaft 16, as indicated by its arrow, effects clockwise rotation of first input gear 20, counter-clockwise rotation of first intermediate gear 36, first intermediate shaft 33, first drive gear 37 and first planetary ring gear 38, clockwise rotation of first sun gear 43 and counter-clockwise rotation of first output pinion 28, first output shaft 24 and extruder screw 31 which is coaxial with and coupled to first output shaft 24 by its spline sleeve 30.

The drive apparatus also includes a second intermediate shaft 44 which extends through housing body 11 and is mounted for rotation in a roller bearing 45 carried by front cover plate 13 and a roller bearing 46 carried by rear cover plate 14 (FIG. 4). A second intermediate gear 47 is secured to and rotatable with shaft 44 and meshes with second input pinion 21. Also secured to and rotatable with second intermediate shaft 44 is a second drive pinion 48 which meshes with a second planetary ring gear 49 (FIG. 5) that is rotatably mounted in a second output pinion 29.

Referring now to FIG. 2, a second sun or idler gear shaft 51 is supported for rotation in roller bearings 52 and 53 and is equipped with a second sun or idler gear 54. Gear 54 is positioned within the confines of a second planetary ring gear 49 and meshes with second drive pinion 48 and with second output pinion 29.

Referring again to FIG. 5, it will be observed that counter-clockwise rotation of second input shaft 17, as indicated by its arrow, effects counter-clockwise rotation of second input pinion 21, clockwise rotation of second intermediate gear 47, second dirve gear 48 and second planetary ring gear 49, counter-clockwise rotation of second sun gear 54, and clockwise rotation of second output pinion 29, second output shaft 25 and extruder screw 32, which is coaxial with and coupled to second output shaft 25 by its spline sleeve 30.

Removably mounted on rear cover 14 by means of a plurality of threaded connector bars 55 and nuts 56 is a first bearing housing 57 (FIGS. 2 and 3), which contains a first thrust bearing 58. The thrust load generated by extruder screw 31 is transmitted to this thrust bearing through first output shaft 24. A second bearing housing 59 is removably mounted on the first bearing housing by means of screws 60 and contains a second thrust bearing 61. The thrust load generated by extruder screw 32 is transmitted to thrust bearing 61 through second output shaft 25. Thrust bearings 58 and 61 are of known construction.

As shown and described, the drives from first and second input shafts 16 and 17 to respective first and second output shafts 24 and 25 are synchronized by intermeshing first and second intermediate gears 36 and 47. Because of this, it is possible to utilize one or two prime movers. Thus, both prime movers 22 and 23 may be used, as shown in the drawings, where power requirements are relatively high. Alternatively and where power requirements are relatively low, only one of of the prime movers, i.e. either 22 or 23, may be employed without necessitating any changes in the arrangement of parts. This constitutes a definite advantage since in the higher power ranges it is more economical to use two relatively small drives instead of one large drive.

While the herein described and illustrated embodiment of the invention is preferred and recommended, it should be borne in mind that it may be desirable and advantageous in some instances to omit input shafts 16 and 17 and their input pinions 20 and 21 and connect prime movers 22 and/or 23 directly to respective intermediate shafts 33 and/or 44. In that case the intermediate shafts would be elongated and project through and beyond openings in housing rear cover plate 14 to permit convenient connection to the prime movers.

Based on the foregoing, it is believed that the construction, operation, objects and advantages of this invention will be readily understood by persons skilled in the art without further description. It is to be clearly understood, however, that various changes in the construction described above and illustrated in the drawings may be made without departing from the scope of the invention, it being intended that all matter contained in this application shall be interpreted as illustrative only and not in a limiting sense.

We claim:

1. Drive apparatus for imparting rotation in opposite directions to first and second output shafts which are rotatable about corresponding longitudinal axes that are parallel and in close proximity to each other comprising support means, a first intermediate shaft carried by the support means, actuating means including a prime mover for imparting rotation to the first intermediate shaft, a first intermediate gear mounted on and rotatable with the first intermediate shaft, a first drive pinion mounted on and rotatable with the first intermediate shaft, a first planetary ring gear carried by and rotatable relative to the support means and meshing with the first drive pinion, a first sun gear shaft carried by the support means, a first sun gear mounted on and rotatable with the first sun gear shaft and meshing with the first drive pinion, said first output shaft being carried by the support means, a first output gear mounted on and rotatable with the first output shaft and meshing with the first internal gear and with the first sun gear, a second intermediate shaft carried by the support means, a second intermediate gear and a second drive pinion mounted on and rotatable with the second intermediate shaft, said second intermediate gear meshing with the first intermediate gear, a second planetary ring gear carried by and rotatable relative to the support means and meshing with the second drive pinion, a second sun gear shaft carried by the support means, a second sun gear mounted on and rotatable with the second sun gear shaft and meshing with the second drive pinion, said second output shaft being carried by the support means and a second output gear mounted on and rotable with the second output shaft and meshing with both the second ring gear and the second sun gear.

2. Drive apparatus according to claim 1 further comprising second actuating means including a second prime mover for imparting rotation to the second intermediate shaft.

3. Drive apparatus according to claim 1 further comprising a first input shaft carried by the support means and connected to and rotatable by the prime mover, and a first input pinion mounted on and rotatable with the first input shaft, said first input pinion meshing with the first intermediate gear.

4. Drive apparatus according to claim 3, further comprising a second input shaft carried by the support means, a second prime mover for imparting rotation to the second input shaft and a second input pinion mounted on and rotatable with the second input shaft and meshing with the second intermediate gear.

5. Drive apparatus according to claim 3 wherein the support means comprises a housing including a horizontally disposed body having an opening extending through and between its front and rear ends, front cover means secured to the front end of the body and rear cover means secured to the rear end of the body, and wherein said pinions and gears are positioned in the body opening, said first and second output shafts extend through the front cover means and said first input shaft extends through the rear cover means.

6. Drive apparatus according to claim 4 wherein the support means comprises a housing including a horizontally disposed body having an opening extending through and between its front and rear ends, front cover means secured to the front end of the body and rear cover means secured to the rear end of the body, and wherein said pinions and gears are positioned in the body opening, said first and second output shafts extend through the front cover means and said first and second input shafts extend through the rear cover means.

7. Drive apparatus according to claim 1 in combination with an extruder including twin screws respectively coupled to the first and second output shafts.

8. Drive apparatus according to claim 3 in combination with an extruder including twin screws respectively coupled to the first and second output shafts.

9. Drive apparatus according to claim 5 in combination with an extruder including twin screws respectively coupled to the first and second output shafts.

10. The combination defined by claim 7 further comprising means carried by the housing for absorbing thrust loads created in the output shafts during normal operation.

11. The combination defined by claim 8 further comprising means carried by the housing for absorbing thrust loads created in the output shafts during normal operation.

12. The combination defined by claim 9 further comprising means carried by the housing for absorbing thrust loads created in the output shafts during normal operation.

* * * * *

UNITED STATES PATENT OFFICE
CERTIFICATE OF CORRECTION

Patent No. 3,824,875      Dated July 23, 1974

Inventor(s) William H. Willert and Jai G. Ro

It is certified that error appears in the above-identified patent and that said Letters Patent are hereby corrected as shown below:

Column 1, line 20, cancel "limiation" and substitute "limitation"

Column 1, line 25, cancel "counterrotating" and substitute "counter-rotating"

Column 1, line 29, cancel "No." and substitute "Nos."

Column 2, line 18, cancel "worthwile" and substitute "worthwhile"

Column 2, line 41, cancel "sung" and substitute "sun"

Column 2, line 54, cancel "primt" and substitute "prime"

Column 2, line 61, cancel "ae" and substitute "are"

Column 4, line 1, insert "to" after "is secured"

Column 4, line 19, cancel "sleeve" and substitute "sleeves"

Column 4, line 34, cancel "rolle" and substitute "roller"

Column 4, line 59, insert "ball bearing 50 within the housing (Fig. 4) and meshes with " after "mounted in a"

Column 5, line 3, cancel "dirve" and substitute "drive"

Column 5, line 29, cancel second "of"

Column 6, line 21, cancel "rotable" and substitute "rotatable"

Signed and sealed this 19th day of November 1974.

(SEAL)
Attest:

McCOY M. GIBSON JR.
Attesting Officer

C. MARSHALL DANN
Commissioner of Patents